United States Patent
Sirotkin et al.

(10) Patent No.: US 12,461,187 B2
(45) Date of Patent: Nov. 4, 2025

(54) SYSTEMS FOR IN-COVERAGE SIDELINK POSITIONING

(71) Applicant: Apple Inc., Cupertino, CA (US)

(72) Inventors: Alexander Sirotkin, Hod Hasharon (IL); Haijing Hu, Los Gatos, CA (US); Seyed Ali Akbar Fakoorian, San Diego, CA (US); Sudeep Manithara Vamanan, Munich (DE); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 533 days.

(21) Appl. No.: 17/950,887

(22) Filed: Sep. 22, 2022

(65) Prior Publication Data

US 2023/0213608 A1    Jul. 6, 2023

Related U.S. Application Data

(60) Provisional application No. 63/296,813, filed on Jan. 5, 2022.

(51) Int. Cl.
*H04L 5/00*      (2006.01)
*G01S 5/00*      (2006.01)
*H04W 24/10*     (2009.01)

(52) U.S. Cl.
CPC .......... *G01S 5/0072* (2013.01); *H04L 5/0051* (2013.01); *H04W 24/10* (2013.01)

(58) Field of Classification Search
CPC . H04L 25/0222; H04L 5/0053; H04L 5/0051; H04L 5/0094; H04W 64/006;

(Continued)

(56) References Cited

U.S. PATENT DOCUMENTS

| 11,451,926 B2* | 9/2022 | Edge ................ H04W 16/28 |
| 2021/0058970 A1* | 2/2021 | Kwak ................ H04W 72/23 |

(Continued)

FOREIGN PATENT DOCUMENTS

| CA | 3225597 A1 * | 3/2023 | ............ H04W 64/00 |
| CN | 112956254 A | 6/2021 | |

(Continued)

OTHER PUBLICATIONS

Apple Inc. "On Rel-18 Positioning," 3GPP TSG RAN Meeting #93-e, RP-212368, Electronic Meeting, Sep. 13-17, 2021, 5 pages.

*Primary Examiner* — David Q Nguyen
(74) *Attorney, Agent, or Firm* — Fish & Richardson P.C.

(57) ABSTRACT

A method performed for side-link (SL) configuration of a plurality of user equipment (UEs), the method comprising: sending, to a transmitting UE (Tx UE) and a receiving UE (Rx UE), a request for sidelink (SL) positioning reference signal (PRS) capabilities data; receiving, from each of the Tx UE and the Rx UE, respective SL PRS capabilities data; configuring a SL positioning reference signal (PRS) that is based on the SL PRS capabilities data for each of the Tx UE and the Rx UE; sending data specifying a selected SL PRS configuration to the Tx UE; receiving an acknowledgement signal from the Tx UE indicating a Tx UE SL PRS configuration that is based on the selected SL PRS configuration; and providing, to the Rx UE, the Tx UE SL PRS configuration.

20 Claims, 7 Drawing Sheets

(58) Field of Classification Search
CPC ..... H04W 76/14; H04W 92/18; H04W 24/10; G01S 1/042; G01S 5/0072; G01S 5/0009; G01S 5/0284; G01S 5/0236; G01S 5/0036
USPC .................. 370/328, 329, 330; 455/456.1
See application file for complete search history.

(56) References Cited

U.S. PATENT DOCUMENTS

| | | |
|---|---|---|
| 2021/0168852 A1 | 6/2021 | Panteleev et al. |
| 2024/0163832 A1* | 5/2024 | Wang ...................... H04W 4/46 |
| 2024/0163840 A1* | 5/2024 | Säily .................. H04L 25/0222 |
| 2024/0172168 A1* | 5/2024 | Bao ........................ G01S 5/0036 |
| 2024/0276430 A1* | 8/2024 | Yilmaz ................ G01S 5/0236 |
| 2024/0397470 A1* | 11/2024 | Hu ........................ G01S 5/0205 |
| 2025/0008473 A1* | 1/2025 | Hu ........................ H04L 5/0051 |

FOREIGN PATENT DOCUMENTS

| | | |
|---|---|---|
| CN | 113383585 A | 9/2021 |
| WO | WO 2021232228 A1 | 11/2021 |
| WO | WO 2021240478 A1 | 12/2021 |
| WO | WO 2021242695 A1 | 12/2021 |

\* cited by examiner

SYSTEMS FOR IN-COVERAGE SIDELINK POSITIONING

CLAIM OF PRIORITY

This application claims priority under 35 U.S.C. § 119(e) to U.S. Patent Application Ser. No. 63/296,813, filed on Jan. 5, 2022, the entire contents of which are hereby incorporated by reference.

TECHNICAL FIELD

This disclosure relates generally to wireless communications.

BACKGROUND

For fifth generation (5G) new radio (NR) networks, sidelink (SL) communication allows direct communication between two user equipment (UE) devices through a direct channel without going through a base station. A Radio Resource Control (RRC) provides the following services for SL. RRC provides transfer of a PC5-RRC message between two UEs. The messages can include configuration information, such as sidelink data radio bearer (SL-DRB) configuration information. The messages can include UE capability information. A UE capability is a piece of information that indicates different parameters that can be supported with respect to different layers. The RRC provides Information Elements (IEs) for transferring such information between UEs.

RRC can provide maintenance and release of a PC5-RRC connection between two UEs, including a PC5 connection. A PC5 connection is a direct connection between two UEs after the establishment of a PC5 unicast link. A UE may have one or multiple connections to another UE.

RRC provides detection of SL radio link failure (SL-RLF) data for a PC5-RRC connection based on an indication from a media access control (MAC) or radio link control (RLC). In a case of SL RLF, the UE releases the resources of the PC5 RRC connection immediately and sends an indication to the upper layer. For RRC CONNECTED UEs, the UE also informs the network upon RLF detection.

SUMMARY

This application describes data processing systems and processes for in-coverage SL positioning. A positioning reference signal (PRS) is sent using sidelink transmissions. The sidelink PRS (SL-PRS) is used for various 5G positioning techniques such as roundtrip time (RTT), angle of arrival/departure (AoA/AoD), and time difference of arrival (TDOA). Roundtrip time (RTT) based positioning removes the requirement of tight network timing synchronization across nodes (as needed in legacy techniques such as TDOA) and offers additional flexibility in network deployment and maintenance.

Sidelink transmission and reception PC5 interfacing are supported for each of when the UE is in NG-RAN coverage and outside NG-RAN coverage. This disclosure describes techniques for supporting sidelink positioning in coverage so that SL positioning is supported both in and out of coverage. Generally, out-of-coverage (using PC5-RRC) is more generic but is also potentially less efficient. When the UE is in-coverage, the network relies on a node (such as a next generation node gNB) and a location management function (LMF) for centralized SL PRS resource assignment, centralized positioning estimation, and other positioning related operations. The systems and processes described herein define the RRC signaling, NR Positioning Protocol A (NRPPa) messages (e.g. see 3GPP TS 38.455 version 15.0.0 Release 15), and LPP signaling to support in-coverage SL positioning functionality. For these processes, only some of the UEs involved in SL positioning need be in coverage during the operations. The in-coverage UEs include the UEs that are performing active communications with the LMF. Other UEs can be out of coverage during execution of the processes described herein. In some implementations, the SL positioning includes vehicle to everything (V2X) communications in which there is direct vehicle to vehicle communication.

To configure the SL PRS, several different approaches are possible. In a first implementation, the LMF requests a SL PRS configuration directly from a UE using the Long Term Evolution (LTE) positioning protocol (LPP) via the Access & Mobility Management Function (AMF). Generally, new LPP messages are defined for the LMF to request the SL PRS configuration (such as bandwidth availability) from a UE and for the UE to report a successful configuration or a failed configuration. The LPP messages can be called SL-PRSConfigurationRequest (LMF to UE) and SL-PRSConfigurationResponse (UE to LMF) messages.

In a second implementation, NRPPa and RRC are used for in-coverage SL PRS. A gNB configures SL PRS in a UE using RRC and sends the configuration to the LMF using NRPPa messages. For configuring the SL PRS in the UE using RRC, the RRCReconfiguration message is enhanced with the SL PRS configuration. For sending the communication to the LMF using NRPPa messages, the NRPPa message positioning information request can be enhanced for the LMF to request SL PRS configuration for a UE. In addition, the positioning information response message is enhanced to send the SL PRS configuration to the LMF.

In a third implementation, the LMF provides the SL PRS configuration as part of the assistance data to the SL UE, which performs measurements and reports location-related results. The LMF-reported SL PRS is realized using an enhanced LPP ProvideAssistanceData message.

To activate or deactivate the SL PRS, the systems are can perform the following implementations. In a first implementation, the LMF activates or deactivates the SL sounding reference signal (SRS) directly in a UE using LPP messages. More specifically, the LPP messages are defined for LMF to activate and deactivate SL SRS transmission. Generally, SRS is an uplink reference signal which is transmitted by UE to a base station. SRS gives information about the combined effect of multipath fading, scattering, Doppler and power loss of a transmitted signal. In some implementations, these LPP messages are called SL-SRSActivationDeactivationRequest (e.g., for LMF to UE transmissions). In some implementations, the LPP messages are called SL-SRSActivationDeactivationResponse (e.g., for UE to LMF transmissions.)

In another implementation, the LMF sends a SL PRS activation or deactivation request to a gNB using NRPPa. The gNB activates or deactivates SL PRS using a MAC control element (CE). In this example, NRPPa positing activation request/response messages are updated to enable such functionality.

The systems and processes described in this document enable one or more of the following advantages, among other advantages. While the UE is in-coverage, it is more efficient to rely on gNB and LMF for centralized SL PRS. Generally, this is because centralized coordination (e.g., via LMF and/or gNB) typically outperforms distributed coordination. Only the UE that is communicating with the gNB or LMF needs to be in coverage. The other UEs can remain out of coverage but still indirectly benefit from this increased efficiency.

Generally, the LPP RequestCapabilities message is enhanced to enable in-coverage SL positioning. As a result, the LMF can request UE SL PRS capabilities. For example, the message may include a sl-RequestCapabilities IE that is extended to support in-coverage SL positioning. Generally, when a UE supporting SL PRS receives RequestCapabilities LPP message with sl RequestCapabilities IE, the IE includes SL PRS capabilities in the ProvideCapabilities LPP message. For example, the message may include a new sl-ProvideCapabilities IE.

Additionally, a number of SL PRS capabilities are reported in addition to a general indication that a UE supports transmutation and reception of SL PRS capabilities. The SL PRS capabilities that are reported include those reported by a transmitting UE or a measuring UE. For a transmitting UE, the SL PRS reported capabilities include a band-List for SL-PRS transmission. The reported capabilities include a transmit power capability for SL-PRS, including the support of power control. The reported capabilities include a beam-sweeping capability of the UE. The reported SL PRS capabilities include how many SL-PRS resources can be transmitted per band for the UE. The reported SL PRS capabilities include a support of each of periodical (P), semi-persistent (SP), and aperiodic (AP) transmission.

The reported SL PRS capabilities include SL-PRS capabilities reported by a measuring UE: For the measuring UE, the reported SL PRS capabilities include whether to support hybrid positioning, whether to support UE-initiated on-demand SL-PRS request, whether to support report multipath in SL-PRS measurements, whether to support RSRP measurement reporting, or whether to support periodic reporting. For the measuring UE, the reported SL PRS capabilities include a maximum SL PRS bandwidth in megahertz (MHz), which is supported and reported by UE. This bandwidth could be different for FR1 compared with FR2. The bandwidth can be different for the case of SL only. The bandwidth can be different for SL+Uu PRS processing. The reported capabilities include a duration of SL PRS symbols N in units of milliseconds (ms) that a UE can process every T ms, assuming a maximum SL PRS bandwidth in MHz, which is supported and reported by the UE. The duration can be different for the case of SL only, or for SL+Uu PRS processing. The reported capabilities can include a maximum number of SL PRS resources that a UE can process in a slot under it. The maximum number can be different for FR1 compared with FR2, different for the case of SL only, or different for SL+Uu PRS processing.

The disclosed techniques are realized by one or more implementations, described in an examples section herein.

The details of one or more implementations are set forth in the accompanying drawings and the description below. The techniques described here can be implemented by one or more wireless communication systems, components of a wireless communication system (e.g., a station, an access point, a user equipment, a base station, etc.), or other systems, devices, methods, or non-transitory computer-readable media, among others. Other features and advantages will be apparent from the description and drawings, and from the claims.

BRIEF DESCRIPTION OF DRAWINGS

Like reference symbols in the various drawings indicate like elements.

DETAILED DESCRIPTION

Figure 1:
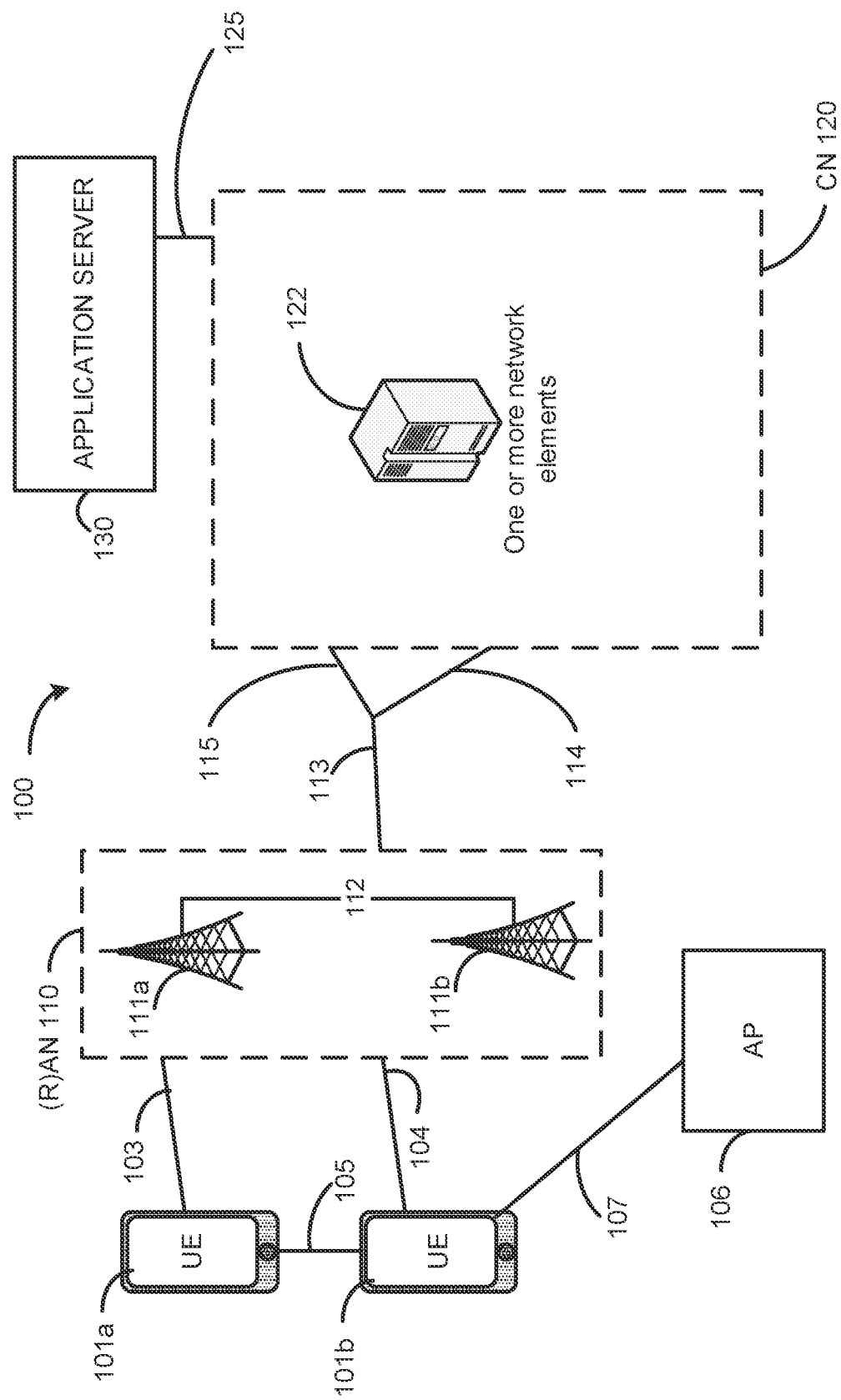
FIG. 1 illustrates an example wireless communication system, according to various implementations herein.

FIG. 1 illustrates an example of a wireless communication system 100. For purposes of convenience and without limitation, the example system 100 is described in the context of Long Term Evolution (LTE) and Fifth Generation (5G) New Radio (NR) communication standards as defined by the Third Generation Partnership Project (3GPP) technical specifications. More specifically, the wireless communication system 100 is described in the context of a Non-Standalone (NSA) networks that incorporate both LTE and NR, for example, E-UTRA (Evolved Universal Terrestrial Radio Access)-NR Dual Connectivity (EN-DC) networks, and NE-DC networks. However, the wireless communication system 100 may also be a Standalone (SA) network that incorporates only NR. Furthermore, other types of communication standards are possible, including future 3GPP systems (e.g., Sixth Generation (6G)) systems, IEEE 802.16 protocols (e.g., WMAN, WiMAX, etc.), or the like.

As shown by FIG. 1, the system 100 includes UE 101a and UE 101b (collectively referred to as "UEs 101" or "UE 101"). In this example, UEs 101 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 101 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 may be configured to connect, for example, communicatively couple, with RAN 110. In embodiments, the RAN 110 may be an NG RAN or a 5G RAN, an E-UTRAN, or a legacy RAN, such as a UTRAN or GERAN. As used herein, the term "NG RAN" or the like may refer to a RAN 110 that operates in an NR or 5G system 100, and the term "E-UTRAN" or the like may refer to a RAN 110 that operates in an LTE or 4G system 100. The UEs 101 utilize connections (or channels) 103 and 104, respectively, each of which comprises a physical communications interface or layer (discussed in further detail below).

In this example, the connections 103 and 104 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, an Advanced long term evolution (LTE-A) protocol, a LTE-based access to unlicensed spectrum (LTE-U), a 5G protocol, a NR protocol, an NR-based access to unlicensed spectrum (NR-U) protocol, and/or any of the other communications protocols discussed herein. In embodiments, the UEs 101 may directly exchange communication data via a ProSe interface 105. The ProSe interface 105 may alternatively be referred to as a SL interface 105 and may comprise one or more logical channels, including but not limited to a PSCCH, a PSSCH, a PSDCH, and a PSBCH.

The UE 101b is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below). In various embodiments, the UE 101b, RAN 110, and AP 106 may be configured to utilize LWA operation and/or LWIP operation. The LWA operation may involve the UE 101b in RRC_CONNECTED being configured by a RAN node 111a-b to utilize radio resources of LTE and WLAN. LWIP operation may involve the UE 101b using WLAN radio resources (e.g., connection 107) via IPsec protocol tunneling to authenticate and encrypt packets (e.g., IP packets) sent over the connection 107. IPsec tunneling may include encapsulating the entirety of original IP packets and adding a new packet header, thereby protecting the original header of the IP packets.

The RAN 110 can include one or more AN nodes or RAN nodes 111a and 111b (collectively referred to as "RAN nodes 111" or "RAN node 111") that enable the connections 103 and 104. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 111 that operates in an NR or 5G system 100 (for example, a gNB), and the term "E-UTRAN node" or the like may refer to a RAN node 111 that operates in an LTE or 4G system 100 (e.g., an eNB). According to various embodiments, the RAN nodes 111 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 111 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 111; a MAC/PHY split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications. In some implementations, an individual RAN node 111 may represent individual gNB-DUs that are connected to a gNB-CU via individual F1 interfaces (not shown by FIG. 1). In these implementations, the gNB-DUs may include one or more remote radio heads or RFEMs, and the gNB-CU may be operated by a server that is located in the RAN 110 (not shown) or by a server pool in a similar manner as the CRAN/vBBUP. Additionally or alternatively, one or more of the RAN nodes 111 may be next generation eNBs (ng-eNBs), which are RAN nodes that provide E-UTRA user plane and control plane protocol terminations toward the UEs 101, and are connected to a 5GC (e.g., CN 220 of FIG. 2) via an NG interface (discussed infra).

In V2X scenarios one or more of the RAN nodes 111 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 101 (vUEs 101). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 can be configured to communicate using OFDM communication signals with each other or with any of the RAN nodes 111 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 101 and the RAN nodes 111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band. NR in the unlicensed spectrum may be referred to as NR-U, and LTE in an unlicensed spectrum may be referred to as LTE-U, licensed assisted access (LAA), or MulteFire.

To operate in the unlicensed spectrum, the UEs 101 and the RAN nodes 111 may operate using LAA, eLAA, and/or feLAA mechanisms. In these implementations, the UEs 101 and the RAN nodes 111 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 101 RAN nodes 111, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 101, AP 106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (s); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 101 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 101. The PDCCH carries information about the transport format and resource allocations related to the PDSCH channel, among other things. It may also inform the UEs 101 about the transport format, resource allocation, and HARQ information related to the uplink shared channel. Typically, downlink scheduling (assigning control and shared channel resource blocks to the UE 101b within a cell) may be performed at any of the RAN nodes 111 based on channel quality information fed back from any of the UEs 101. The downlink resource assignment information may be sent on the PDCCH used for (e.g., assigned to) each of the UEs 101.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 111 may be configured to communicate with one another via interface 112. In embodiments where the system 100 is an LTE system, the interface 112 may be an X2 interface 112. The X2 interface may be defined between two or more RAN nodes 111 (e.g., two or more eNBs and the like) that connect to EPC 120, and/or between two eNBs connecting to EPC 120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 101 from an SeNB for user data; information of PDCP PDUs that were not delivered to a UE 101; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 100 is a 5G or NR system (e.g., when CN 120 is an 5GC 220 as in FIG. 2), the interface 112 may be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support may include context transfer from an old (source) serving RAN node 111 to new (target) serving RAN node 111; and control of user plane tunnels between old (source) serving RAN node 111 to new (target) serving RAN node 111. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 110 is shown to be communicatively coupled to a core network-in this embodiment, core network (CN) 120. The CN 120 may comprise a plurality of network elements 122, which are configured to offer various data and telecommunications services to customers/subscribers (e.g., users of UEs 101) who are connected to the CN 120 via the RAN 110. The components of the CN 120 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 130 may be an element offering applications that use IP bearer resources with the core network (e.g., UMTS PS domain, LTE PS data services, etc.). The application server 130 can also be configured to support one or more communication services (e.g., VoIP sessions, PTT sessions, group communication sessions, social networking services, etc.) for the UEs 101 via the EPC 120.

In embodiments, the CN 120 may be a 5GC (referred to as "5GC 120" or the like), and the RAN 110 may be connected with the CN 120 via an NG interface 113. In embodiments, the NG interface 113 may be split into two parts, an NG user plane (NG-U) interface 114, which carries traffic data between the RAN nodes 111 and a UPF, and the S1 control plane (NG-C) interface 115, which is a signaling interface between the RAN nodes 111 and AMFs. Embodiments where the CN 120 is a 5GC 120 are discussed in more detail with regard to FIG. 2.

In embodiments, the CN 120 may be a 5G CN (referred to as "5GC 120" or the like), while in other embodiments, the CN 120 may be an EPC). Where CN 120 is an EPC (referred to as "EPC 120" or the like), the RAN 110 may be connected with the CN 120 via an S1 interface 113. In embodiments, the S1 interface 113 may be split into two parts, an S1 user plane (S1-U) interface 114, which carries traffic data between the RAN nodes 111 and the S-GW, and the S1-MME interface 115, which is a signaling interface between the RAN nodes 111 and MMES.

Figure 2:
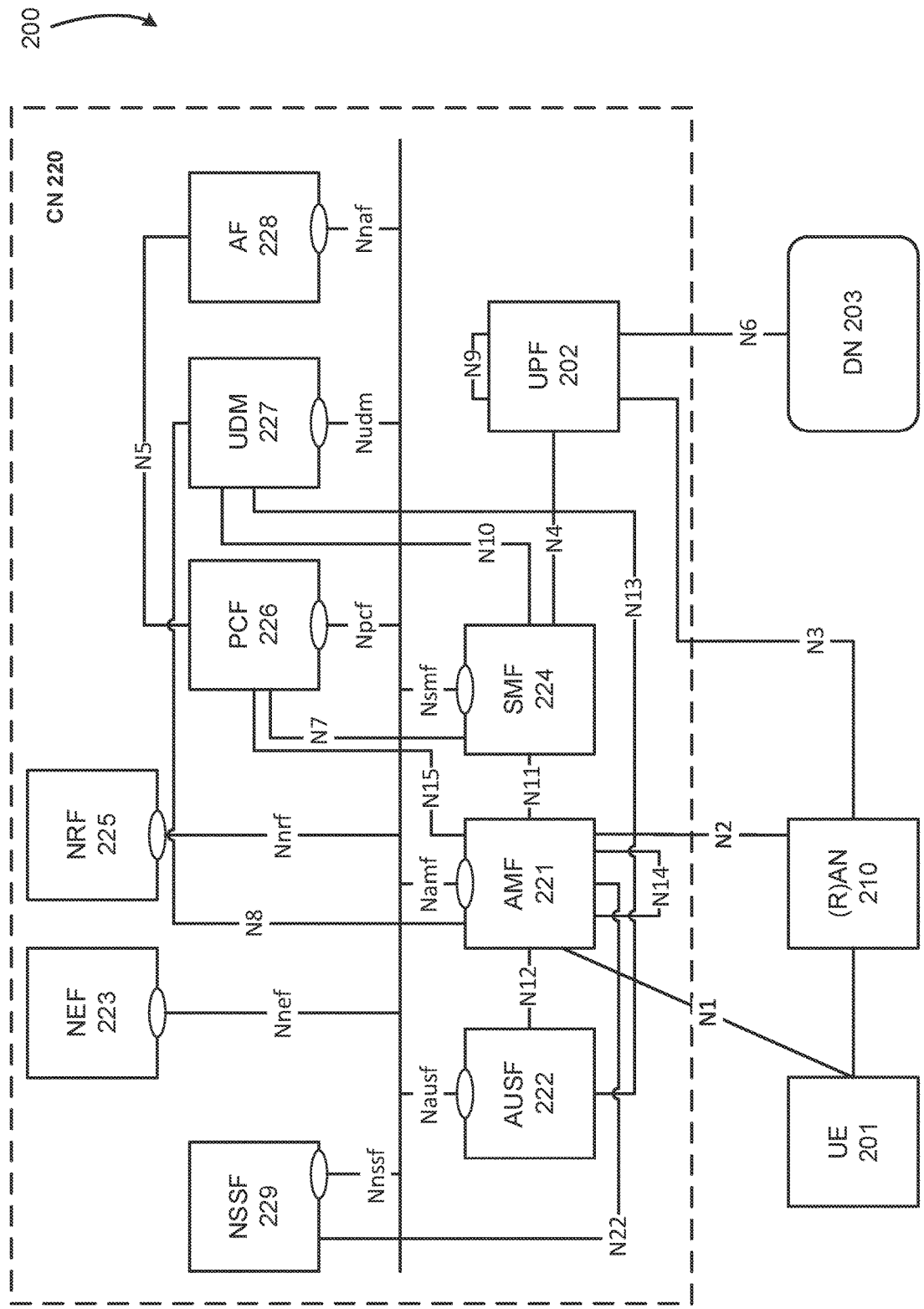
FIG. 2 illustrates an example of a computing device in accordance with various implementations.

FIG. 2 illustrates an architecture of a system 200 including a second CN 220 in accordance with various embodiments. The system 200 is shown to include a UE 201, which may be the same or similar to the UEs 101 and UE XR 101 discussed previously; a (R)AN 210, which may be the same or similar to the RAN 110 and RAN XR 110 discussed previously, and which may include RAN nodes 111 discussed previously; and a DN 203, which may be, for example, operator services, Internet access or 3rd party services; and a 5GC 220. The 5GC 220 may include an AUSF 222; an AMF 221; a SMF 224; a NEF 223; a PCF 226; a NRF 225; a UDM 227; an AF 228; a UPF 202; and a NSSF 229.

The UPF 202 may act as an anchor point for intra-RAT and inter-RAT mobility, an external PDU session point of interconnect to DN 203, and a branching point to support multi-homed PDU session. The UPF 202 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 202 may include an uplink classifier to support routing traffic flows to a data network. The DN 203 may represent various network operator services, Internet access, or third party services. DN 203 may include, or be similar to, application server 130 discussed previously. The UPF 202 may interact with the SMF 224 via an N4 reference point between the SMF 224 and the UPF 202.

The AUSF 222 may store data for authentication of UE 201 and handle authentication-related functionality. The AUSF 222 may facilitate a common authentication framework for various access types. The AUSF 222 may communicate with the AMF 221 via an N12 reference point between the AMF 221 and the AUSF 222; and may communicate with the UDM 227 via an N13 reference point between the UDM 227 and the AUSF 222. Additionally, the AUSF 222 may exhibit an Nausf service-based interface.

The AMF 221 may be responsible for registration management (e.g., for registering UE 201, etc.), connection management, reachability management, mobility management, and lawful interception of AMF-related events, and access authentication and authorization. The AMF 221 may be a termination point for the N11 reference point between the AMF 221 and the SMF 224. The AMF 221 may provide transport for SM messages between the UE 201 and the SMF 224, and act as a transparent proxy for routing SM messages. AMF 221 may also provide transport for SMS messages between UE 201 and an SMSF (not shown by FIG. 2). AMF 221 may act as SEAF, which may include interaction with the AUSF 222 and the UE 201, receipt of an intermediate key that was established as a result of the UE 201 authentication process. Where USIM based authentication is used, the AMF 221 may retrieve the security material from the AUSF 222. AMF 221 may also include a SCM function, which receives a key from the SEA that it uses to derive access-network specific keys. Furthermore, AMF 221 may be a termination point of a RAN CP interface, which may include or be an N2 reference point between the (R)AN 210 and the AMF 221; and the AMF 221 may be a termination point of NAS (N1) signaling, and perform NAS ciphering and integrity protection.

AMF 221 may also support NAS signaling with a UE 201 over an N3 IWF interface. The N3IWF may be used to provide access to untrusted entities. N3IWF may be a termination point for the N2 interface between the (R)AN 210 and the AMF 221 for the control plane, and may be a termination point for the N3 reference point between the (R)AN 210 and the UPF 202 for the user plane. As such, the AMF 221 may handle N2 signaling from the SMF 224 and the AMF 221 for PDU sessions and QoS, encapsulate/de-encapsulate packets for IPSec and N3 tunneling, mark N3 user-plane packets in the uplink, and enforce QoS corresponding to N3 packet marking taking into account QoS requirements associated with such marking received over N2. N3IWF may also relay uplink and downlink control-plane NAS signaling between the UE 201 and AMF 221 via an N1 reference point between the UE 201 and the AMF 221, and relay uplink and downlink user-plane packets between the UE 201 and UPF 202. The N3IWF also provides mechanisms for IPsec tunnel establishment with the UE 201. The AMF 221 may exhibit an Namf service-based interface, and may be a termination point for an N14 reference point between two AMFs 221 and an N17 reference point between the AMF 221 and a 5G-EIR (not shown by FIG. 2).

The UE 201 may need to register with the AMF 221 in order to receive network services. RM is used to register or deregister the UE 201 with the network (e.g., AMF 221), and establish a UE context in the network (e.g., AMF 221). The UE 201 may operate in an RM-REGISTERED state or an RM-DEREGISTERED state. In the RM DEREGISTERED state, the UE 201 is not registered with the network, and the UE context in AMF 221 holds no valid location or routing information for the UE 201 so the UE 201 is not reachable by the AMF 221. In the RM REGISTERED state, the UE 201 is registered with the network, and the UE context in AMF 221 may hold a valid location or routing information for the UE 201 so the UE 201 is reachable by the AMF 221. In the RM-REGISTERED state, the UE 201 may perform mobility Registration Update procedures, perform periodic Registration Update procedures triggered by expiration of the periodic update timer (e.g., to notify the network that the UE 201 is still active), and perform a Registration Update procedure to update UE capability information or to re-negotiate protocol parameters with the network, among others.

The AMF 221 may store one or more RM contexts for the UE 201, where each RM context is associated with a specific access to the network. The RM context may be a data structure, database object, etc. That indicates or stores, inter alia, a registration state per access type and the periodic update timer. The AMF 221 may also store a 5GC MM context that may be the same or similar to the (E)MM context discussed previously. In various embodiments, the AMF 221 may store a CE mode B Restriction parameter of the UE 201 in an associated MM context or RM context. The AMF 221 may also derive the value, when needed, from the UE's usage setting parameter already stored in the UE context (and/or MM/RM context).

CM may be used to establish and release a signaling connection between the UE 201 and the AMF 221 over the N1 interface. The signaling connection is used to enable NAS signaling exchange between the UE 201 and the CN 220, and comprises both the signaling connection between the UE and the AN (e.g., RRC connection or UE-N3IWF connection for non-3GPP access) and the N2 connection for the UE 201 between the AN (e.g., RAN 210) and the AMF 221. The UE 201 may operate in one of two CM states, CM-IDLE mode or CM-CONNECTED mode. When the UE 201 is operating in the CM-IDLE state/mode, the UE 201 may have no NAS signaling connection established with the AMF 221 over the N1 interface, and there may be (R)AN 210 signaling connection (e.g., N2 and/or N3 connections) for the UE 201. When the UE 201 is operating in the CM-CONNECTED state/mode, the UE 201 may have an established NAS signaling connection with the AMF 221 over the N1 interface, and there may be a (R)AN 210 signaling connection (e.g., N2 and/or N3 connections) for the UE 201. Establishment of an N2 connection between the (R)AN 210 and the AMF 221 may cause the UE 201 to transition from CM-IDLE mode to CM-CONNECTED mode, and the UE 201 may transition from the CM-CONNECTED mode to the CM-IDLE mode when N2 signaling between the (R)AN 210 and the AMF 221 is released.

The SMF 224 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 201 and a data network (DN) 203 identified by a Data Network Name (DNN). PDU sessions may be established upon UE 201 request, modified upon UE 201 and 5GC 220 request, and released upon UE 201 and 5GC 220 request using NAS SM signaling exchanged over the N1 reference point between the UE 201 and the SMF 224. Upon request from an application server, the 5GC 220 may trigger a specific application in the UE 201. In response to receipt of the trigger message, the UE 201 may pass the trigger message (or relevant parts/information of the trigger message) to one or more identified applications in the UE 201. The identified application(s) in the UE 201 may establish a PDU session to a specific DNN. The SMF 224 may check whether the UE 201 requests are compliant with user subscription information associated with the UE 201. In this regard, the SMF 224 may retrieve and/or request to receive update notifications on SMF 224 level subscription data from the UDM 227.

The SMF 224 may include the following roaming functionality: handling local enforcement to apply QoS SLAB (VPLMN); charging data collection and charging interface (VPLMN); lawful intercept (in VPLMN for SM events and interface to LI system); and support for interaction with external DN for transport of signaling for PDU session authorization/authentication by external DN. An N16 reference point between two SMFs 224 may be included in the system 200, which may be between another SMF 224 in a visited network and the SMF 224 in the home network in roaming scenarios. Additionally, the SMF 224 may exhibit the Nsmf service-based interface.

The NEF 223 may provide means for securely exposing the services and capabilities provided by 3GPP network functions for third party, internal exposure/re-exposure, Application Functions (e.g., AF 228), edge computing or fog computing systems, etc. In such embodiments, the NEF 223 may authenticate, authorize, and/or throttle the AFs. NEF 223 may also translate information exchanged with the AF 228 and information exchanged with internal network functions. For example, the NEF 223 may translate between an AF-Service-Identifier and an internal 5GC information. NEF 223 may also receive information from other network functions (NFs) based on exposed capabilities of other network functions. This information may be stored at the NEF 223 as structured data, or at a data storage NF using standardized interfaces. The stored information can then be re-exposed by the NEF 223 to other NFs and AFs, and/or used for other purposes such as analytics. Additionally, the NEF 223 may exhibit an Nnef service-based interface.

The NRF 225 may support service discovery functions, receive NF discovery requests from NF instances, and provide the information of the discovered NF instances to the NF instances. NRF 225 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 225 may exhibit the Nnrf service-based interface.

The PCF 226 may provide policy rules to control plane function(s) to enforce them, and may also support unified policy framework to govern network behavior. The PCF 226 may also implement an FE to access subscription information relevant for policy decisions in a UDR of the UDM 227. The PCF 226 may communicate with the AMF 221 via an N15 reference point between the PCF 226 and the AMF 221, which may include a PCF 226 in a visited network and the AMF 221 in case of roaming scenarios. The PCF 226 may communicate with the AF 228 via an N5 reference point between the PCF 226 and the AF 228; and with the SMF 224 via an N7 reference point between the PCF 226 and the SMF 224. The system 200 and/or CN 220 may also include an N24 reference point between the PCF 226 (in the home network) and a PCF 226 in a visited network. Additionally, the PCF 226 may exhibit an Npcf service-based interface.

The UDM 227 may handle subscription-related information to support the network entities' handling of communication sessions, and may store subscription data of UE 201. For example, subscription data may be communicated between the UDM 227 and the AMF 221 via an N8 reference point between the UDM 227 and the AMF. The UDM 227 may include two parts, an application FE and a UDR (the FE and UDR are not shown by FIG. 2). The UDR may store subscription data and policy data for the UDM 227 and the PCF 226, and/or structured data for exposure and application data (including PFDs for application detection, application request information for multiple UEs 201) for the NEF 223. The Nudr service-based interface may be exhibited by the UDR 221 to allow the UDM 227, PCF 226, and NEF 223 to access a particular set of the stored data, as well as to read, update (e.g., add, modify), delete, and subscribe to notification of relevant data changes in the UDR. The UDM may include a UDM-FE, which is in charge of processing credentials, location management, subscription management, and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 224 via an N10 reference point between the UDM 227 and the SMF 224. UDM 227 may also support SMS management, wherein an SMS-FE implements the similar application logic as discussed previously. Additionally, the UDM 227 may exhibit the Nudm service-based interface.

The AF 228 may provide application influence on traffic routing, provide access to the NCE, and interact with the policy framework for policy control. The NCE may be a mechanism that allows the 5GC 220 and AF 228 to provide information to each other via NEF 223, which may be used for edge computing implementations. In such implementations, the network operator and third party services may be hosted close to the UE 201 access point of attachment to achieve an efficient service delivery through the reduced end-to-end latency and load on the transport network. For edge computing implementations, the 5GC may select a UPF 202 close to the UE 201 and execute traffic steering from the UPF 202 to DN 203 via the N6 interface. This may be based on the UE subscription data, UE location, and information provided by the AF 228. In this way, the AF 228 may influence UPF (re)selection and traffic routing. Based on operator deployment, when AF 228 is considered to be a trusted entity, the network operator may permit AF 228 to interact directly with relevant NFs. Additionally, the AF 228 may exhibit an Naf service-based interface.

The NSSF 229 may select a set of network slice instances serving the UE 201. The NSSF 229 may also determine allowed NSSAI and the mapping to the subscribed S-NS-SAIs, if needed. The NSSF 229 may also determine the AMF set to be used to serve the UE 201, or a list of candidate AMF(s) 221 based on a suitable configuration and possibly by querying the NRF 225. The selection of a set of network slice instances for the UE 201 may be triggered by the AMF 221 with which the UE 201 is registered by interacting with the NSSF 229, which may lead to a change of AMF 221. The NSSF 229 may interact with the AMF 221 via an N22 reference point between AMF 221 and NSSF 229; and may communicate with another NSSF 229 in a visited network via an N31 reference point (not shown by FIG. 2). Additionally, the NSSF 229 may exhibit an Nnssf service-based interface.

As discussed previously, the CN 220 may include an SMSF, which may be responsible for SMS subscription checking and verification, and relaying SM messages to/from the UE 201 to/from other entities, such as an SMS-GMSC/IWMSC/SMS-router. The SMS may also interact with AMF 221 and UDM 227 for a notification procedure that the UE 201 is available for SMS transfer (e.g., set a UE not reachable flag, and notifying UDM 227 when UE 201 is available for SMS).

The CN 120 may also include other elements that are not shown by FIG. 2, such as a Data Storage system/architecture, a 5G-ER, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 2). Individual NFs may share a UDSF for storing their respective unstructured data or individual NFs may each have their own UDSF located at or near the individual NFs. Additionally, the UDSF may exhibit an Nudsf service-based interface (not shown by FIG. 2). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 2 for clarity. In one example, the CN 220 may include an Nx interface, which is an inter-CN interface between the MME (e.g., MME XR 121) and the AMF 221 in order to enable interworking between CN 220 and CN XR 120. Other example interfaces/reference points may include an N5g-EIR service-based interface exhibited by a 5G-ER, an N27 reference point between the NRF in the visited network and the NRF in the home network; and an N31 reference point between the NSSF in the visited network and the NSSF in the home network.

Figure 3:
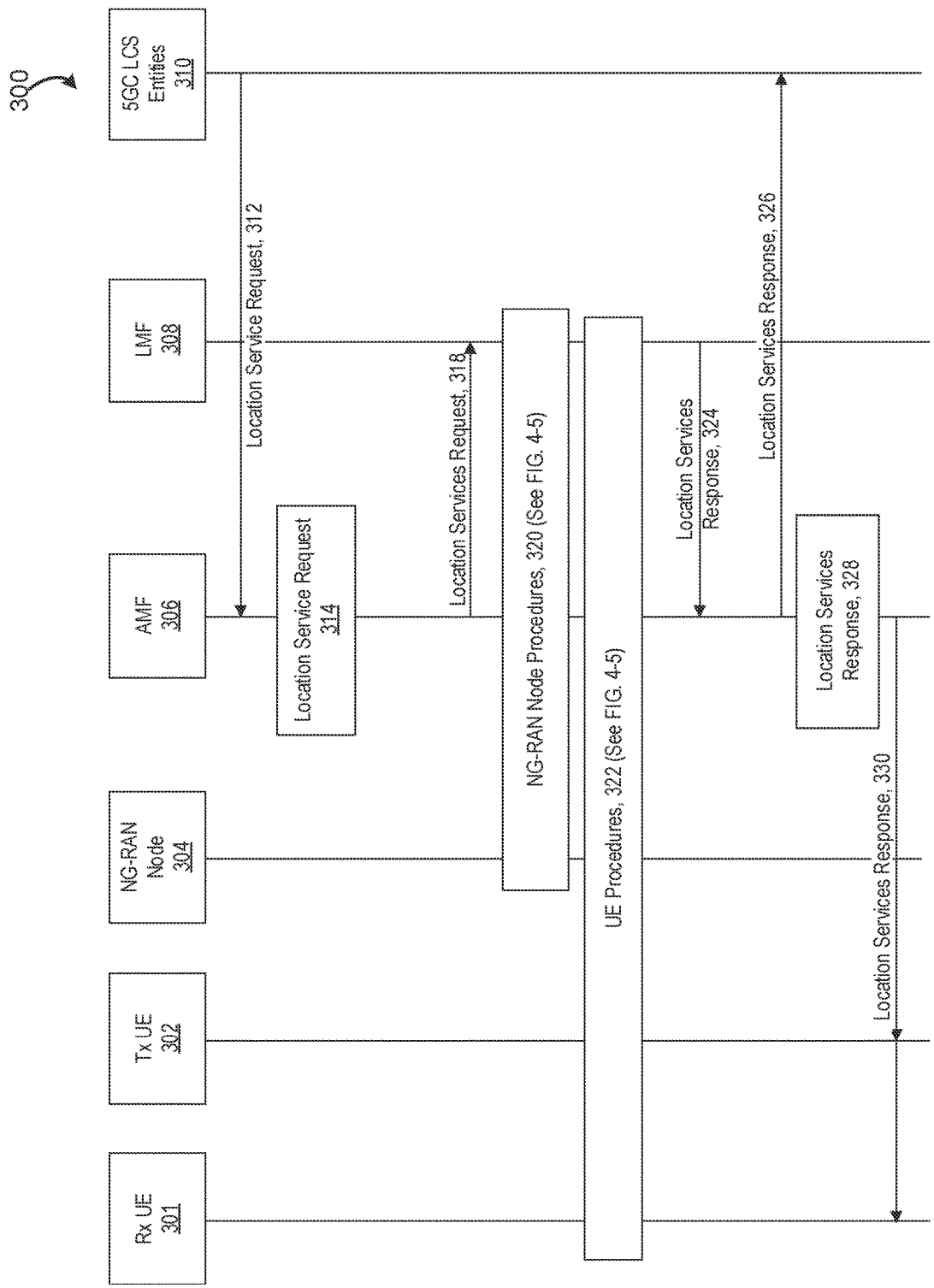
FIG. 3 is a diagram illustrating sidelink communication in a network.

FIG. 3 is a diagram illustrating sidelink communication in a network 300. Network 300 is configured for in coverage SL PRS. The network 300 incudes 5GC location services (LCS) entities 310. These can include any entities that provide or require location based services. For example, LCS entities 310 can include a Gateway Mobile Location Centre (GMLC). The GMLC is a control plane system that interfaces with emergency and commercial LCS clients and the operator's network to provide the location of a mobile device, required to support Location Based Services (LBS). Other such examples of LCS entities are possible. The network includes 300 a location management function (LMF). The LMF can be a server (or other implementation of location management) that collects measurements from devices (e.g., UES 301, 302) and configures signaling for the UEs. The LMF handles location service requests for the UEs and responds to these requests with responses from the UEs. The Access and Mobility Management Function (AMF) 306 is a control plane function in the 5G core network, as previously described. Functions of the AMF include registration management for UEs 301, 302, reachability management for the UEs, and connection management for the UEs. Network 300 includes at least two UEs 301, 302. UE 302 is called a transmitting UE (or Tx UE) and is the UE that is in coverage and therefore connected to the LMF 308. The receiving UE (Rx UE) 301 is a second UE in the network 300 that is not necessarily in coverage and therefore not necessarily connected to the LMF 308. Rather, the Rx UE 301 is connected to the Tx UE 302 using SL communications (e.g., using the PC5 interface).

A general process for SL positioning is now described. Network 300 is shown with general relationships between the entities 301, 302, 304, 306, 308, and 310. More specific implementations of the in coverage SL positioning are described herein, and subsequently described in relation to FIGS. 4-7. A location service request 312 is sent from the LCS entities 310 to the AMF 306. For example, some entity in the 5GC (e.g., the GMLC) requests a location service (e.g., positioning) for a target UE 302 to the serving AMF 306. In another example, the serving AMF 306 determines at step 314, for a target UE 302, a need for a location service (e.g., to locate the UE 302 for an emergency call). At step 318, the AMF 306 transfers the location service request to the LMF 308

The LMF 308 initiates (320) location procedures with the serving ng-gNB in the NG-RAN, such as to obtain positioning measurements or assistance data. At step 320, the in coverage SL PRS is configured. One or more of processes 400, 500, 600, and 700 can be used for SL PRS configuration. In general, at step 320, the LMF 308 configures the SL PRS by performing the following operations.

The LMF 308 learns the capabilities for each of the Tx UE 302 and the Rx UE 301. The capabilities include the transmission band and bandwidth availability for each of the UEs 301, 302. The capabilities include a list of operations that are supported by each of the UEs 301, 302, including positioning capabilities. Here, the Tx UE 302 reports what resources are available for SL PRS transmission. For example, the transmitting UE 302 can report the following potential SL-PRS capabilities to the LMF 308. The transmitting UE 302 can report a band-list for SL-PRS transmission. The band-list includes the available transmission frequency bands for SL-PRS transmission. The UE 302 can report a transmit power capability for SL-PRS. The transmit power capability includes an indication of support for power control. The UE 302 reports a beam-sweeping capability of the UE 302. The beam sweeping capability includes what beamforming is possible. For example, the beam sweeping capability describes how beams are searched by the UE and what beam configurations are available for SL-PRS. The UE 302 reports a number representing how many SL-PRS resources can be transmitted per band. The UE 302 reports what kinds of transmission are available for SL-PRS. For example, the UE 302 reports whether a periodical transmission is available, semi-persistent transmission is available, and/or whether aperiodic transmission is available.

The measuring UE 301 is configured to report the following capabilities for SL-PRS. For example, the measuring UE is configured to report whether the Rx UE 301 supports hybrid positioning. Here, hybrid positioning includes using SL PRS and Uu PRS measurements together to determine positioning. The Rx UE 301 is configured to report whether support for UE-initiated on-demand SL-PRS requests is available. The Rx UE 301 is configured to support whether multi-path in SL-PRS measurements are supported. The Rx UE 301 is configured to report whether RSRP measurement is supported. The Rx UE 301 is configured to report whether periodic reporting is supported. The Rx UE 301 is configured to report a maximum SL PRS bandwidth in MHz that is supported by the UE 301. The maximum SL PRS bandwidth can be different for frequency range 1 (FR1) or frequency range 2 (FR2). The maximum bandwidth can be different SL only communication in comparison with SL+Uu PRS communication. The UE 301 is configured to report a duration of SL PRS symbols N in units of milliseconds (ms) that the UE 301 can process every T ms. This is assuming maximum SL PRS bandwidth in MHz. The values for the duration in N units of ms that are supported by the UE 301 are reported by UE 301. The duration can be different for SL only communications in comparison with SL+Uu PRS processing. The Rx UE 301 is configured to report a maximum number of SL PRS resources that the UE 301 is able to process in a slot. The maximum number can be different for FR1 in comparison with FR2. The maximum number of slots can be different for SL communication only in comparison with SL+Uu PRS processing.

Specific examples of UE 301, 302 capabilities are now described. The UEs 301, 302 can be configured for different values for a maximum SL PRS bandwidth in MHz, which is supported and reported by the respective UE 301, 302. For example the UE 301, 302 can support FR1 bands: {5, 10, 20, 40, 50, 80, 100} for in coverage SL PRS. The UEs 301, 302 can support FR2 bands: {50, 100, 200, 400} for in coverage SL PRS. The UEs 301, 302 support downlink (DL) PRS buffering capability of either Type 1 or Type 2. For Type 1, a sub-slot/symbol level buffering scheme is used. For Type 2, a slot level buffering scheme is used. The UEs 301, 302 report this capability to the LMF 308. The UEs 301, 302 report a duration of DL PRS symbols N in units of ms a UE can process every T ms assuming maximum DL PRS bandwidth in MHz, which is supported and reported by UE, as previously described. Example values of N include {0.125, 0.25, 0.5, 1, 2, 4, 6, 8, 12, 16, 20, 25, 30, 32, 35, 40, 45, 50} ms. Example values of T include {8, 16, 20, 30, 40, 80, 160, 320, 640, 1280} ms. The maximum number of DL PRS resources that a UE 301, 302 can process in a slot under it include the following. For FR1 bands, the number can be one of {1, 2, 4, 6, 8, 12, 16, 24, 32, 48, 64} for each SCS having a band of 15 kHz, 30 kHz, or 60 kHz. For FR2 bands, the number is {1, 2, 4, 6, 8, 12, 16, 24, 32, 48, 64} for each SCS including 60 kHz or 120 kHz.

Once the capabilities of the UEs 301, 302 are reported to the LMF 308 via the AMF 306, the LMF 308 is configured to configure the SL PRS in accordance with the reported capabilities. In a general description, for this embodiment, the LMF 308 configures the SL PRS for each of the UEs 301, 302. The LMF 308 sends the SL PRS configuration data to the UE 302. The LMF 308 receives acknowledgement from the Tx UE 302 that the PRS configuration has been applied to the Tx UE 302. The LMF 308 provides the SL PRS configuration applied by the Tx UE 302 to the Rx UE 301 so that the Rx UE can measure the PRS. The LMF 308 receives the PRS configuration applied from the Tx UE 302 and from the Rx UE 301 (via the Tx UE 302). A PRS positioning measurement from the Rx UE can be received that specifies a distance between the UEs 514. If absolute coordinates of one of the UEs 301, 302 is known, the positioning measurements of each of the UEs 301, 302 are used to determine absolute coordinates of all UEs. A positioning measurement can include one or more of a range measurement, a time of flight measurement, a time difference of arrival measurement, an angle of arrival measurement, or some combination thereof.

For DL positioning, the LMF 308 can initiate location procedures 322 with the UE 302 to obtain a location estimate or positioning measurements or to transfer location assistance data to the UE 302. The AMF 306 collects UE measurements at step 322 and provides them to the LMF 308. The LMF 308 provides (234) a location service response to the AMF 306 and includes any results, such as a success or failure indication. In addition, if requested and obtained, the results include a location estimate for the UE 302. A location services response 326 is sent to the entities 310 by the AMF 306. The AMF 306 returns the location service response 326 to the 5GC entity 310 included results such as a location estimate for the UE 302. In some implementations, the AMF 306 uses the location service response 324 to assist the service that triggered the request from the entities 310. For example, AMF 306 can provide a location services response 328 provide a location estimate for either UE 301, 302 associated with an emergency call to a GMLC. The location services response 330 can include transmission of data to the UE 302 or to the UE 301 via UE 302. As described in relation to FIG. 4, the particular messaging used to request UE 301, 302 capabilities, receive the responses, and configure the SL PRS for the UEs can vary. In a first example, the LA/IF 308 uses LPP messages to communicate with the UEs 302, and UE 301 via UE 302, for SL PRS configuration. This is described in relation to FIG. 4. In another example, the AMF 308 communicates to the UEs 301, 302 using NRPPa signaling. In this later example, the LMF 308 communicates through the NG-RAN node to reach the UEs 301, 302. This example is described in relation to FIG. 4.

The location determination process for network 300 can involve the use of different position methods to obtain location related measurements for a target UE and from these compute a location estimate and possibly additional information like velocity. Positioning methods include the following examples. A positioning methods for NG-RAN access include network-assisted GNSS methods, observed time difference of arrival (OTDOA) positioning, enhanced cell ID methods, WLAN positioning, Bluetooth positioning, terrestrial beacon system (TBS) positioning, and sensor based methods including using barometric pressure sensors and motion sensors data. In some implementations, hybrid positioning using multiple methods from the list of positioning methods above is also supported. In some implementations, a standalone mode (e.g. autonomous, without network assistance) using one or more methods from the list of positioning methods above is also supported.

Figure 4:
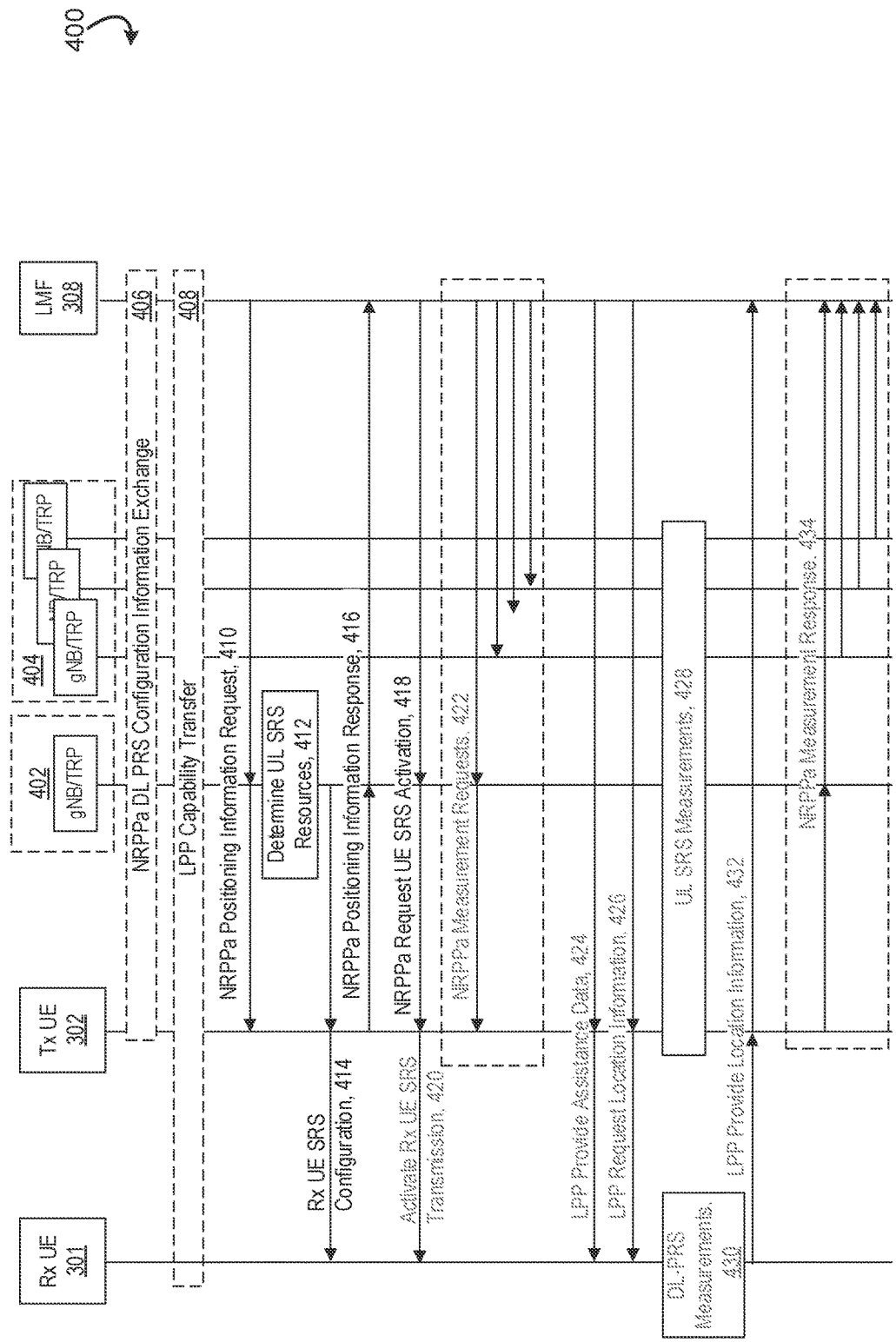
FIG. 4 is a diagram illustrating a network supporting in-coverage sidelink configuration.

FIG. 4 is a diagram illustrating a network 400 supporting in-coverage sidelink configuration. For capabilities reporting and configuration, the LPP (LTE positioning protocol) RequestCapabilities message is enhanced, so that LMF 308 can request UE SL PRS capabilities. For example, the message may include a new sl-RequestCapabilities IE that supports the capabilities requesting/reporting described in relation to FIG. 3. When a UE 302 supporting SL PRS receives the RequestCapabilities LPP message with a sl-RequestCapabilities IE, the UE 302 is configured to report SL PRS capabilities in the ProvideCapabilities LPP message back to the LMF 308. For example, the message may include a sl-ProvideCapabilities IE that requests one or more of the capabilities previously listed for reporting by the UE 302 or UE 301 via UE 302. In some implementations, a complete list of SL PRS capabilities is requested. In some implementations, specific values for SL are requested, and other values have assumed default values. Besides a general indication that the UE 301, 302 supports transmutation and reception of SL PRS capabilities, each of the SL PRS capabilities previously described can be reported either individually or in any combination. Even though a UE 302, 301 may support SL and UL or DL positioning in the Uu interface (e.g., the NR-Uu interface, connecting the UE to the gNB over the air), the UE necessarily support "hybrid" positioning, so the capabilities reported may depend on what is requested by the LMF 308.

The LMF 308 can configure SL PRS as now described. In an embodiment, the LMF 308 requests SL PRS configuration directly from UE 302 or UE 301 via UE 302 using LPP (LTE positioning protocol) messages. LPP messages are defined for the LMF 308 to request SL PRS configuration (e.g. bandwidth or other SL PRS capabilities previously described) from the UE 302 and for the UE 302 to report successful configuration (or failure). The LPP messages can be called SL-PRSConfigurationRequest (e.g., LMF 308 to UE 302, 301) and SL-PRSConfigurationResponse (e.g., UE 301, 302 to LMF 308). These messages are newly added to the existing LPP protocol. The LPP messages are not read by the NG RAN node (e.g., gNB/TRP 402 or group of gNBs/TRPs 404). Therefore, the gNB does not change the capabilities reported to the LMF 308, and does not change the SL PRS configuration by the LMF 308 for the UEs 301, 302. In FIG. 4, the LPP capability transfer 408 represents the first step for configuration of SL PRS by LPP messaging. At step 408, the LPP capability transfer is performed between the UEs 301, 302 and the LMF 308. The capabilities transfer 408 provides the SL PRS capabilities from the UEs 301, 302 to the LMF 308 over LPP messages. In this example, once the UEs 301, 302 are configured, the LMF 308 sends LPP messages to the UEs 301, 302 to provide assistance data 424 or to request location information 426. To reach UE 301, the LPP messages 424, 426 are sent via gNBs 402, 404 to UE 302, which send the requests to UE 301. The UEs 301, 302 provide response data including location information in LPP message 432. The response data 432 are sent to the LMF 308 via gNBs which do not read the LPP messages.

In another embodiment, the LMF 308 and/or gNB 402 uses the NRPPa protocol RRC to configure the SL PRS. For this embodiment, the gNB 402 configures SL PRS in the UE 302 via RRC and sends the configuration to the LMF 308 via NRPPa signaling. For configuring the UE 302, the gNB 402 message RRCReconfiguration is enhanced with SL PRS configuration parameters specifying what the SL PRS configuration is for the UEs 301, 302. For the NRPPa message to the LMF 308, a positioning information request message can be enhanced for the LMF 308 to request the SL PRS configuration (for the UE 302). In addition, the positioning information response message of the NRPPa signaling is enhanced to send the SL PRS configuration to the LMF 308. In FIG. 4, the NRPPa configuration is shown at step 406. To configure SL PRS using the NRPPa signaling, the NRPPa DL PRS configuration IE 406 is sent as previously described. The LMF 308 sends a positioning information request 410 using the NRPPa message. In this embodiment, the gNB 402 is configured to determine UL SRS resources at step 412. The determined SRS resources data is sent to the UEs 301, 302 (e.g., to UE 301 via UE 302). This is sent using an Rx UE SRS configuration message 414 from UE 302 to UE 301. An NRPPa positioning information response 416 is sent form the UE 302 to the LMF 308 via the gNB 402 as previously described. The LMF 308 responds with an NRPPa message requesting UE SR activation 418. This is forwarded to the UE 301 via UE 302 in an activate Rx UE SRS transmission 420. After the UEs 301, 302 are configured using the NRPPa messages, the LMF 308 sends a plurality of NRPPa measurement requests 422 to each of the gNBs 402, 404 of the network 400. These requests 422 are forwarded to the UE 302. As shown in FIG. 4, the UEs 302 (and UE 301 via UE 302) provide location data to the gNBs 402, 404. The respective gNBs 402, 404 then provide measurement response data to the LMF 308 using an NRPPa measurement response messages 434.

In another embodiment the LMF 308 provides the SL PRS configuration previously described as part of assistance data to the SL UE 302. This UE 302 performs measurements and reports location-related results. This functionality is realized using LPP ProvideAssistanceData message 424.

In some implementations, when the UE 302 reports the SL-PRS measurements to LMF 308, the UE 301, 302 includes the following data. The SL-PRS measurements include an identifier of SL-PRS transmitter, which can be SL-PRS-ID or SL-TRP-ID. The identifier corresponds to the identifier used in the LPP assistance data 424. The report includes absolute radio-frequency channel number (ARFCN), which is a code that specifies a pair of physical radio carriers used for transmission and reception in a land mobile radio system, one for the uplink signal and one for the downlink signal. The UE 301, 302 can also report the frequency information about where the measurement occurs. The UE 301, 302 can report SL-PRS resource ID or resource set ID, which corresponds to an ID used in LPP assistance data. The UE 301, 302 can report relative time of arrival (RTOA). The UE 301, 302 can report reference signal time difference (RSTD). RSTD measurements include a reference TPR concept in SL, which may be a known PRU. The UE 301, 302 can report a measurement timestamp. The UE 301, 302 can report a timing quality for time-based measurements. The UE 301, 302 can report SL-RSRP results as additional measurements besides time or angle based measurements.

In some implementations, the SRS configuration may include the SL-PRS-ID or SL-TRP-ID. For each SL-PRS-ID or each SL-TRP-ID, the LMF 308 includes the following information for UE 301, 302 to receive and measure. The LMF 308 includes a request for frequency information, including the carrier (e.g., ARFCN). The LMF 308 includes a request for a starting offset of a resource or resource set (e.g., offset to DFN #0). Here, DFN means Direct Frame Number. The LMF 308 includes a request for resource repetition pattern, including slot-offset and symbol-offset values. The LMF 308 includes a request for an expected SL-PRS measurement value. This request is to prevent measurement of a far-away SL transmitter which uses a same SL-PRS resource. The LMF 308 includes a request for a measurement error margin (e.g., an uncertainty). The LMF 308 includes a request for details for L1 parameters such as Tx power, comb-Size, the SL-PRS sequence, and so forth. The LMF 308 can request a reference SL-TPR and its resource configuration.

Generally, the SL-PRS ID is not part of the SL-PRS signal. There is no unique physical cell ID used in the SL channel. The receiving UE 302 does uniquely identify the SL-PRS-ID by tracking a unique characteristic(s) of the PRS transmission itself, such as timing and frequency location of resource transmission or a unique SL-PRS sequence.

The gNB is configured to ensure each periodic SL-PRS resource can be uniquely associated with one SL transmitter in its cell coverage. This can be done as part NRPPa messaging. However, this may not be guaranteed for LPP messaging previously described.

Activation and deactivation of the SL PRS are now described. The LMF 308 activates or deactivates SL PRS directly in a UE 301, 302 using LPP messaging. LPP messages are defined for the LMF 308 to activate and deactivate SL SRS transmission. For example, the LPP messages are called SL-SRSActivationDeactivationRequest (for LMF 308 to UE 302 messaging) and SL-SRSActivationDeactivationResponse (for UE 302 to LMF 308 messaging).

In an example, a SL-SRSActivationDeactivationRequest IE message is shown below. The SL-SRSActivationDeactivationRequest message body in a LPP message is used by the location server to request the target device to activate SL SRS transmission.

```
-- ASN1START
RequestCapabilities ::= SEQUENCE {
    criticalExtensions        CHOICE {
        c1                                         CHOICE {
            activationDeactivation        ActivationDeactivation,
            slSRSResourceSetID      INTEGER,
            spare2 NULL, spare1 NULL
        },
        criticalExtensionsFuture   SEQUENCE { }
    }
}
ActivationDeactivation ::= ENUMERATED {
    activation,
    deactivation,
    ...
}
-- ASN1STOP
```

An example SL-SRSActivationDeactivationResponse message is shown below. The SL-SRSActivationDeactivationResponse message body in a LPP message indicates the result of the SL SRS activation or deactivation request.

```
-- ASN1START
ProvideCapabilities ::= SEQUENCE {
    criticalExtensions       CHOICE {
        c1                                        CHOICE {
            activationDeactivationResult
        ActivationDeactivationResult,
            spare3 NULL, spare2 NULL, spare1 NULL
        },
        criticalExtensionsFuture   SEQUENCE { }
    }
}
ActivationDeactivationResult ::= ENUMERATED {
    success,
    failure,
    ...
}
-- ASN1STOP
```

In another example of activation and/or deactivation by the LMF 308, the LMF 308 sends a SL PRS activation or deactivation request to a gNB using NRPPa signaling. The gNB then activates or deactivates the SL PRS using a MAC CE. NRPPa positioning activation request/response messages are enhanced to enable this functionality. Examples of the NRPPa messages are now described. Example parameters for the positioning activation request parameters are shown in Tables 1-2, below. In table 1, a first message configuration is shown. This message is sent by the LMF to cause the NG RAN node to activate/trigger UL SRS transmission by the UE.

TABLE 1

NRPPa signaling for position activation request/response for LMF → NG-RAN node.

| IE/Group Name | Presence | IE type and reference | Semantics description | Criticality | Assigned Criticality |
| --- | --- | --- | --- | --- | --- |
| Message Type | M | 9.2.3 | | YES | reject |
| NRPPa Transaction ID | M | 9.2.4 | | — | |
| CHOICE SRS type | M | | | YES | reject |

TABLE 1-continued

NRPPa signaling for position activation request/response for LMF → NG-RAN node.

| IE/Group Name | Presence | IE type and reference | Semantics description | Criticality | Assigned Criticality |
|---|---|---|---|---|---|
| >Semi-persistent | | | | | |
| >>SRS Resource Set ID | M | 9.2.33 | | — | — |
| >>SRS Spatial Relation | O | Spatial Relation Information 9.2.34 | | YES | ignore- |
| >Aperiodic | | | | | |
| >>Aperiodic | M | ENUMERATED(true, . . .) | | — | — |
| >>SRS Resource Trigger | O | 9.2.35 | | — | — |
| Activation Time | O | Relative Time 1900 9.2.36 | Indicates the start time when the SRS activation is requested | YES | ignore |
| SL | O | ENUMERATED(true, . . .) | | YES | ignore |

In Table 2, a positioning activation response message is shown. This message is sent by NG-RAN node to confirm successful UL SRS activation in the UE.

TABLE 2

NRPPa signaling for position activation request/response for NG-RAN node → LMF.

| IE/Group Name | Presence | IE type and reference | Semantics description | Criticality | Assigned Criticality |
|---|---|---|---|---|---|
| Message Type | M | 9.2.3 | | YES | reject |
| NRPPa Transaction ID | M | 9.2.4 | | — | — |
| Criticality Diagnostics | O | 9.2.2 | | YES | ignore |
| System Frame Number | O | INTEGER(0 . . . 1023) | | YES | ignore |
| Slot Number | O | INTEGER(0 . . . 79) | | YES | ignore |

Figure 5:
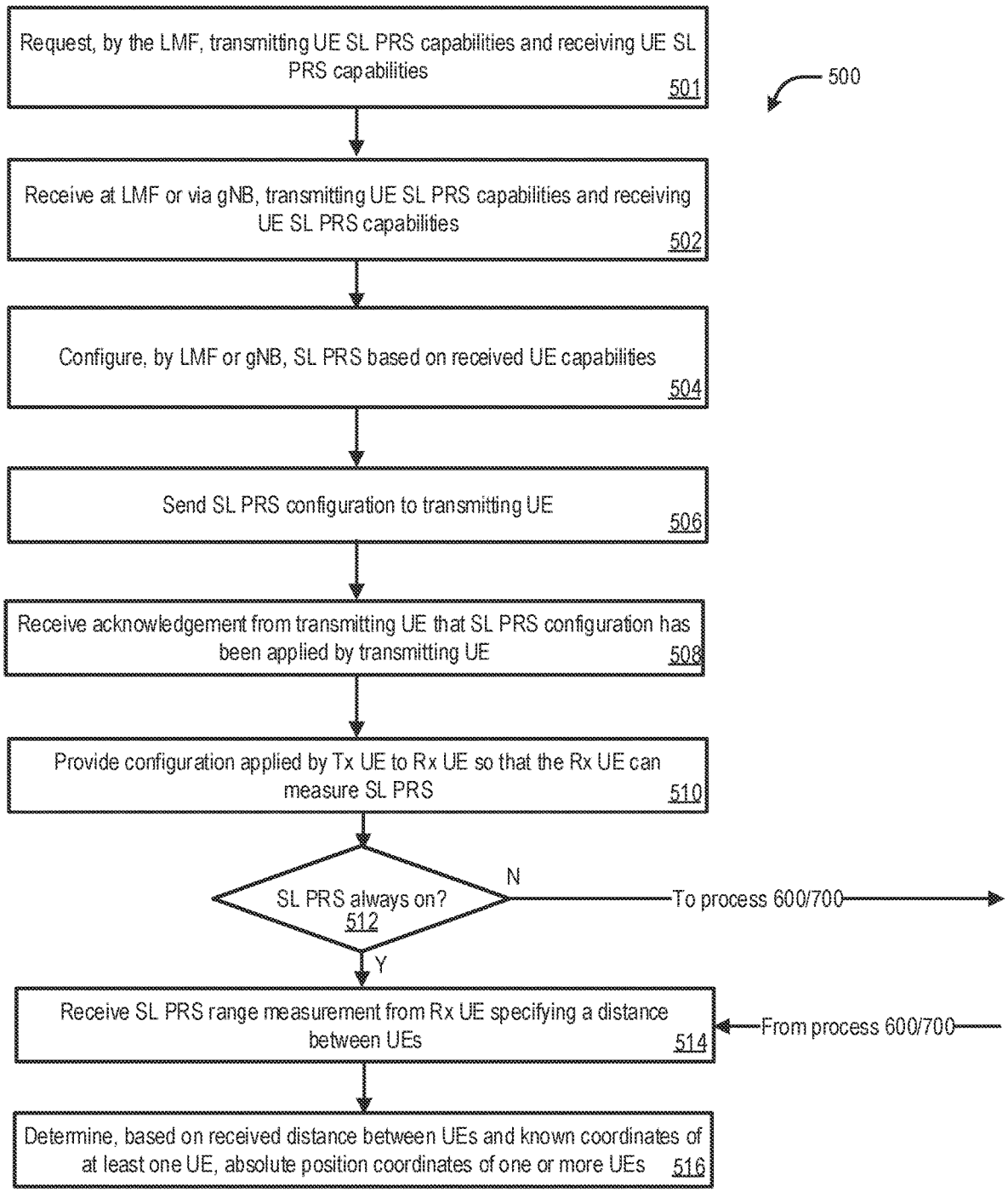
FIG. 5 is a flow diagram illustrating an example process for in coverage sidelink configuration.

FIG. 5 is a flow diagram illustrating an example process 500 for in coverage sidelink configuration. Process 500 can be performed by the components described previously in relation to FIGS. 1-4, such as networks 300, 400. The In process 500, the LMF requests (501) SL PRS capabilities for UEs 301, 302. The LMF 308 or gNB 402 is configured to receive (502), Tx UE 302 SL PRS capabilities data and Rx UE SL PRS capabilities. As previously described, in a first embodiment, the SL PRS capabilities request and response are performed using LPP messaging from the LMF 308 to the UEs 301, 302. As previously described, in another embodiment, the SL PRS capabilities request and response are performed using NRPPa messages. When the NRPPa messages are used, the gNB is configured to receive the capabilities data (or otherwise determine what the configuration for the SL PRS is for the UEs 301, 302). When the LPP messages are used, the SL PRS configuration is performed by the AMF 308.

The process 500 includes configuring (504), based on the received capabilities data from the UEs 301, 302, the SL PRS. The configuration is performed by the AMF 308 when LPP messaging is used. When NRPPa messaging is used, the gNB 402 can configure the SL PRS. The entity that configured the SL PRS (e.g., the gNB 402 or the AMF 308) sends (506) the SL PRS configuration to UEs 302 and UE 301 via UE 302. The AMF 308 send the LPP messages via the gNB 402, but the gNB 402 does not alter the SL PRS configuration.

The AMF 308 or gNB 402 receives (508) an acknowledgement from the Tx UE 302 that the SL PRS configuration has been applied by the UE 301 and the UE 302, respectively. The SL PRS configuration is provided (510) to the Rx UE 301 so that the Rx UE 301 can measure the SL PRS.

The SL PRS status is checked (512). When the SL PRS is always on at check 512, the AMF 308 or gNB 402 receives (514) the SL PRS positioning measurement from the UE 302 specifying a distance between the UEs 301, 302. When the SL PRS is not always on, processes 600 or 700 are invoked for SL PRS activation/deactivation, as subsequently described. Once process 600/700 is performed to activate the SL PRS as needed, the LMF 308 or gNB 402 receives (514) the SL PRS positioning data.

The process 500 includes determining (516), based the received distance between the UEs 301, 302, and known coordinates of at least one of the UEs 301, 302, an absolute position of at least one of the UEs.

Figure 6:
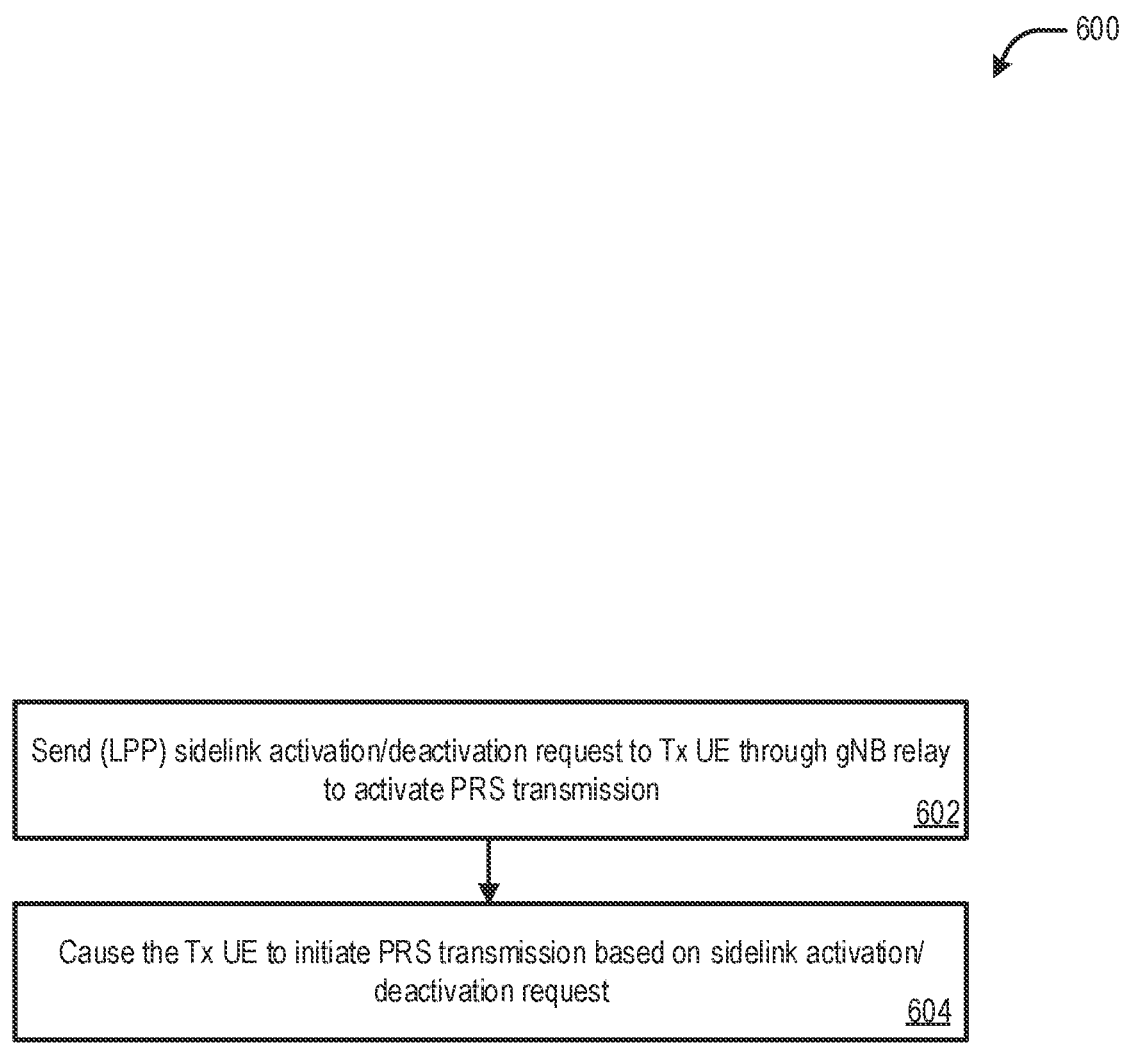
FIG. 6 is a flow diagram illustrating an example process for in coverage sidelink configuration using LPP messages.

FIG. 6 is a flow diagram illustrating an example process 600 for in coverage sidelink configuration using LPP messages. Process 600 can be performed by the components described previously in relation to FIGS. 1-4, such as in networks 300, 400. The process 600 is performed when LPP messaging is used by the LMF 308 for SL PRS configuration. If the SL PRS is not activated or should be deactivated, the LMF 308 sends (602) a LPP SL activation/deactivation request to the Tx UE 302 through gNB 402 to activate PRS transmission. The process 600 includes causing (604) the Tx UE 302 to initiate PRS transmission based on SL the activation/deactivation request of step 602.

Figure 7:
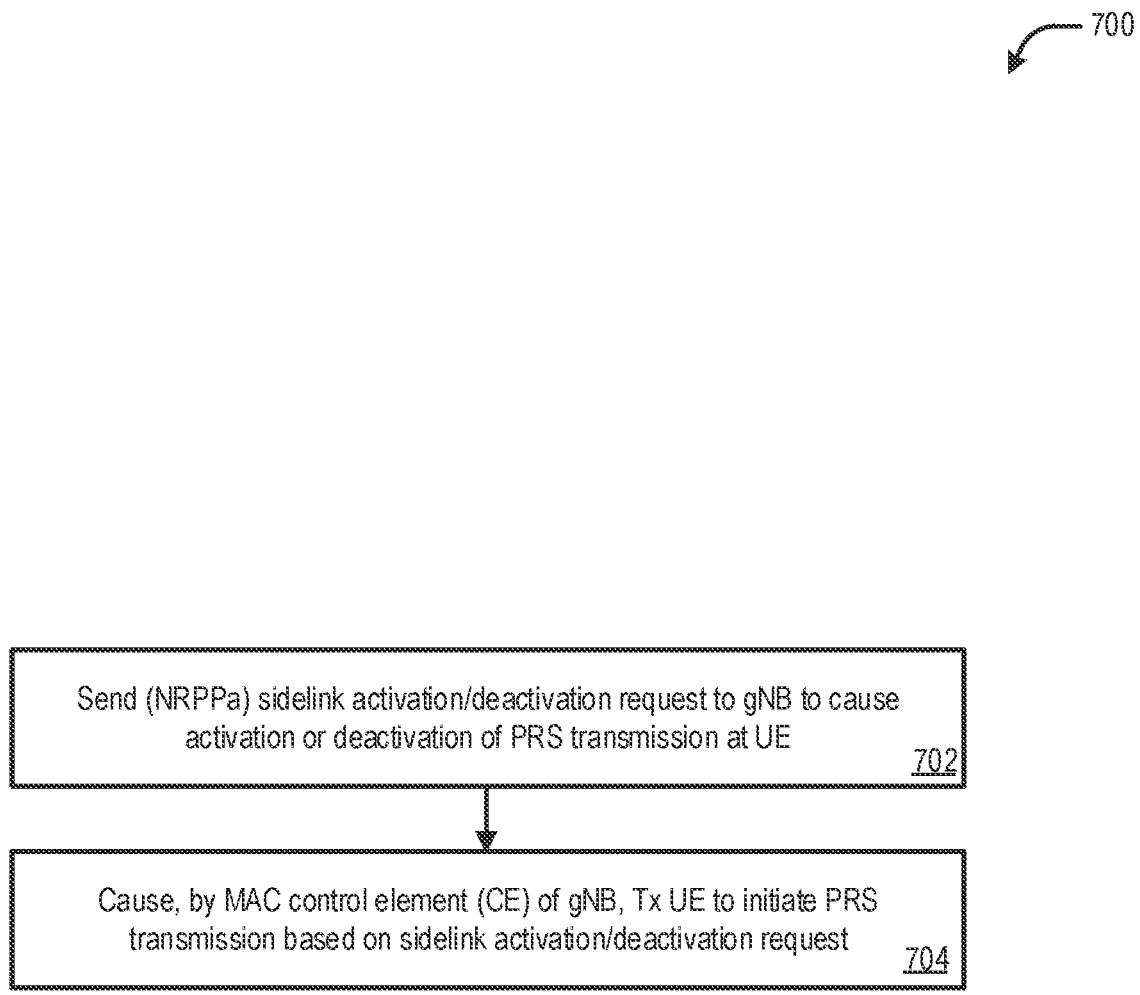
FIG. 7 is a flow diagram illustrating an example process for in coverage sidelink configuration using NRPPa messages.

FIG. 7 is a flow diagram illustrating an example process 700 for in coverage sidelink configuration using NRPPa messages. Process 700 can be performed by the components described previously in relation to FIGS. 1-4, such as in networks 300, 400. The LMF 208 sends (702) an NRPPa sidelink activation/deactivation request to the gNB 402. The gNB then sends the request to the UE 302 to cause activation or deactivation of PRS transmission at UE 302. The gNB causes (704), by a by MAC control element (CE) of the gNB, the Tx UE 302 to initiate PRS transmission based on SL activation/deactivation request of step 702.

EXAMPLES

In the following sections, further exemplary embodiments are provided.

Example 1 includes a method performed for side-link (SL) configuration of a plurality of user equipment (UEs). The method includes sending, to a transmitting UE (Tx UE) and a receiving UE (Rx UE), a request for sidelink (SL) positioning reference signal (PRS) capabilities data; receiving, from each of the Tx UE and the Rx UE, respective SL PRS capabilities data; configuring a SL positioning reference signal (PRS) that is based on the SL PRS capabilities data for each of the Tx UE and the Rx UE; sending data specifying a selected SL PRS configuration to the Tx UE; receiving an acknowledgement signal from the Tx UE indicating a Tx UE SL PRS configuration that is based on the selected SL PRS configuration; and providing, to the Rx UE, the Tx UE SL PRS configuration.

Example 2 may include example 1 and further includes receiving, from the Rx UE, a positioning measurement based on the Tx UE SL PRS configuration.

Example 3 may include any of examples 1-2 and further includes configuring the SL PRS by a location management function (LMF).

Example 4 may include examples 1-3 and further includes configuring the SL PRS by a (gNB).

Example 5 may include any of examples 1-4 and further includes configuring the SL PRS by a gNB and a LMF, wherein the LMF generates the SL PRS configuration, and wherein the gNB updates at least a portion of the SL PRS configuration.

Example 6 may include any of examples 1-5 and further includes a gNB sending the request for the SL PRS capabilities data using radio resource control (RRC) signaling, and wherein the gNB sends the capabilities data to a LMF using a new radio positioning protocol A (NRPPa) message.

Example 7 may include any of examples 1-6, wherein a LMF sends the request for the SL PRS capabilities data using an LTE positioning protocol (LPP) message.

Example 8 may include any of examples 1-7, wherein the LMF provides the SL PRS configuration as part of an LPP provide assistance data message being sent to the Tx UE and/or the Rx UE.

Example 9 may include any of examples 1-8, further comprising sending an LPP message including a SL activation/deactivation request to Tx UE through gNB relay to activate PRS transmission; and causing the UE to initiate PRS transmission based on the SL activation/deactivation request.

Example 10 may include any of examples 1-9, further comprising: sending a NRPPa message including a SL activation/deactivation request to cause activation or deactivation of PRS transmission at UE; and causing, by a medium access control (MAC) control element (CE) of a gNB, the UE to initiate PRS transmission based on the SL activation/deactivation request.

Example 11 may include any of examples 1-10, wherein the SL PRS capabilities data comprises an SL-PRS-ID.

Example 12 may include any of examples 1-11, wherein the SL PRS capabilities data comprises an ARFCN.

Example 13 may include any of examples 1-12, wherein the SL PRS capabilities data comprises one or more of a starting offset of a resource or a resource set and a resource repetition pattern.

Example 14 may include any of examples 1-13, wherein the SL PRS capabilities data comprises an expected SL-PRS measurement value.

Example 15 may include any of examples 1-14, wherein the SL PRS capabilities data comprises a measurement error margin.

Example 16 may include any of examples 1-15, wherein configuring the SL PRS comprises configuring hybrid positioning.

Example 17 may include any of examples 1-16, wherein configuring the SL PRS comprises configuring a UE-initiated on-demand SL-PRS request.

Example 18 may include any of examples 1-17, wherein configuring the SL PRS comprises configuring a multi-path in SL-PRS measurements.

Example 19 may include any of examples 1-18, wherein configuring the SL PRS comprises configuring RSRP measurement reporting.

Example 20 may include any of examples 1-19, wherein configuring the SL PRS comprises configuring periodic reporting.

Example 21 may include any of examples 1-20, wherein configuring the SL PRS comprises configuring a maximum SL PRS bandwidth in MHz.

Example 22 may include any of examples 1-21, wherein configuring the SL PRS comprises configuring a duration of SL PRS symbols a number of in units of milliseconds a UE can process every given number of milliseconds.

Example 23 may include any of examples 1-22, wherein configuring the SL PRS comprises configuring a number of SL PRS resources that the Tx UE or Rx UE processes in a slot.

Example 24 includes a system configured to perform side-link (SL) configuration of a plurality of user equipment (UEs), the system comprising: at least one processor; and a memory storing instructions that, when executed by the at least one processor, cause the at least one processor to perform operations comprising: sending, to a transmitting UE (Tx UE) and a receiving UE (Rx UE), a request for sidelink (SL) positioning reference signal (PRS) capabilities data; receiving, from each of the Tx UE and the Rx UE, respective SL PRS capabilities data; configuring a SL positioning reference signal (PRS) that is based on the SL PRS capabilities data for each of the Tx UE and the Rx UE; sending data specifying a selected SL PRS configuration to the Tx UE; receiving an acknowledgement signal from the Tx UE indicating a Tx UE SL PRS configuration that is based on the selected SL PRS configuration; providing, to the Rx UE, the Tx UE SL PRS configuration; and receiving, from the Rx UE, a positioning measurement based on the Tx UE SL PRS configuration.

Example 25 may include example 24 and further includes configuring the SL PRS by a location management function (LMF).

Example 26 may include examples 24-25 and further includes configuring the SL PRS by a next generation node (gNB).

Example 27 may include any of examples 24-26 and further includes configuring the SL PRS by a gNB and a LMF, wherein the LMF generates the SL PRS configuration, and wherein the gNB updates at least a portion of the SL PRS configuration.

Example 28 may include any of examples 24-27 and further includes a gNB sending the request for the SL PRS capabilities data using radio resource control (RRC) signaling, and wherein the gNB sends the capabilities data to a LMF using a new radio positioning protocol A (NRPPa) message.

Example 29 may include any of examples 24-28, wherein a LA/IF sends the request for the SL PRS capabilities data using an LTE positioning protocol (LPP) message.

Example 30 may include any of examples 24-29, wherein the LMF provides the SL PRS configuration as part of an LPP provide assistance data message being sent to the Tx UE and/or the Rx UE.

Example 31 may include any of examples 24-30, further comprising sending an LPP message including a SL activation/deactivation request to Tx UE through gNB relay to activate PRS transmission; and causing the UE to initiate PRS transmission based on the SL activation/deactivation request.

Example 32 may include any of examples 24-31, further comprising: sending a NRPPa message including a SL activation/deactivation request to cause activation or deactivation of PRS transmission at UE; and causing, by a medium access control (MAC) control element (CE) of a gNB, the UE to initiate PRS transmission based on the SL activation/deactivation request.

Example 33 may include any of examples 24-32, wherein the SL PRS capabilities data comprises an SL-PRS-ID.

Example 34 may include any of examples 24-33, wherein the SL PRS capabilities data comprises an ARFCN.

Example 35 may include any of examples 24-34, wherein the SL PRS capabilities data comprises one or more of a starting offset of a resource or a resource set and a resource repetition pattern.

Example 36 may include any of examples 24-35, wherein the SL PRS capabilities data comprises an expected SL-PRS measurement value.

Example 37 may include any of examples 24-36, wherein the SL PRS capabilities data comprises a measurement error margin.

Example 38 may include any of examples 24-37, wherein configuring the SL PRS comprises configuring hybrid positioning.

Example 39 may include any of examples 24-38, wherein configuring the SL PRS comprises configuring a UE-initiated on-demand SL-PRS request.

Example 40 may include any of examples 24-39, wherein configuring the SL PRS comprises configuring a multi-path in SL-PRS measurements.

Example 41 may include any of examples 24-40, wherein configuring the SL PRS comprises configuring RSRP measurement reporting.

Example 42 may include any of examples 24-41, wherein configuring the SL PRS comprises configuring periodic reporting.

Example 43 may include any of examples 24-42, wherein configuring the SL PRS comprises configuring a maximum SL PRS bandwidth in MHz.

Example 44 may include any of examples 24-43, wherein configuring the SL PRS comprises configuring a duration of SL PRS symbols a number of in units of milliseconds a UE can process every given number of milliseconds.

Example 45 may include any of examples 24-44, wherein configuring the SL PRS comprises configuring a number of SL PRS resources that the Tx UE or Rx UE processes in a slot.

Example 46 may include a user equipment (UE) configured to perform side-link (SL) communication, the UE comprising: at least one processor; and a memory storing instructions that, when executed by the at least one processor, cause the at least one processor to perform operations comprising: receiving, from a network device, a request for sidelink (SL) positioning reference signal (PRS) capabilities data; sending, to the network device, SL PRS capabilities data; receiving, from the network device, data specifying a configuration of a SL positioning reference signal (PRS) that is based on the SL PRS capabilities data; sending, to the network device, an acknowledgement signal indicating a UE SL PRS configuration that is based on the data specifying the configuration of the SL PRS; receiving, from the network device, a SL PRS configuration for another UE; and sending, to the network device, a positioning measurement based on the UE SL PRS configuration and the SL PRS configuration of the other UE.

Example 47 may include example 46, wherein the network device comprises a location management function (LMF).

Example 48 may include any of examples 46-47, wherein the network device comprises a gNB.

Example 49 may include any of examples 46-48, wherein the SL PRS is configured by a gNB and a LMF, wherein the LMF generates the SL PRS configuration, and wherein the gNB updates at least a portion of the SL PRS configuration.

Example 50 may include any of examples 46-49, wherein a gNB sends the request for the SL PRS capabilities data using radio resource control (RRC) signaling, and wherein the gNB sends the configuration data to a LMF using a new radio positioning protocol A (NRPPa) message.

Example 51 may include any of examples 46-50, wherein a LMF sends the request for the SL PRS capabilities data using an LTE positioning protocol (LPP) message.

Example 52 may include any of examples 46-51, wherein the LMF provides the SL PRS configuration as part of an LPP provide assistance data message being sent to the UE and/or the other UE.

Example 53 may include any of examples 46-52, the operations further comprising: receiving an LPP message including a SL activation/deactivation request, through a gNB relay, to activate PRS transmission; and initiating PRS transmission based on the SL activation/deactivation request.

Example 54 may include any of examples 46-54, the operations further comprising: receiving an NRPPa message including a SL activation/deactivation request; and initiating, in response to receiving a medium access control (MAC) control element (CE) from a gNB, a PRS transmission based on the SL activation/deactivation request.

Example 55 may include any of examples 46-54, wherein the SL PRS capabilities data comprises an SL-PRS-ID.

Example 56 may include any of examples 46-55, wherein the SL PRS capabilities data comprises an ARFCN.

Example 57 may include any of examples 46-56, wherein the SL PRS capabilities data comprises one or more of a starting offset of a resource or a resource set and a resource repetition pattern.

Example 58 may include any of examples 46-57, wherein the SL PRS capabilities data comprises an expected SL-PRS measurement value.

Example 59 may include any of examples 46-58, wherein the SL PRS capabilities data comprises a measurement error margin.

Example 60 may include any of examples 46-59, wherein the SL PRS comprises a configuration of hybrid positioning.

Example 61 may include any of examples 46-60, wherein configuring the SL PRS comprises a configuration of a UE-initiated on-demand SL-PRS request.

Example 62 may include any of examples 46-61, wherein configuring the SL PRS comprises a configuration of a multi-path in SL-PRS measurements.

Example 63 may include any of examples 46-62, wherein configuring the SL PRS comprises a configuration of RSRP measurement reporting.

Example 64 may include any of examples 46-63, wherein configuring the SL PRS comprises a configuration of periodic reporting.

Example 65 may include any of examples 46-64, wherein configuring the SL PRS comprises a configuration of a maximum SL PRS bandwidth in MHz.

Example 66 may include any of examples 46-65, wherein configuring the SL PRS comprises a configuration of a duration of SL PRS symbols a number of in units of milliseconds a UE can process every given number of milliseconds.

Example 67 may include any of examples 46-66, wherein configuring the SL PRS comprises a configuration of a number of SL PRS resources that the UE or the other UE processes in a slot.

Example 68 may include a signal as described in or related to any of examples 1-67, or portions or parts thereof.

Example 69 may include a datagram, information element, packet, frame, segment, PDU, or message as described in or related to any of examples 1-68, or portions or parts thereof, or otherwise described in the present disclosure.

Example 70 may include a signal encoded with data as described in or related to any of examples 1-68, or portions or parts thereof, or otherwise described in the present disclosure.

Example 71 may include a signal encoded with a datagram, IE, packet, frame, segment, PDU, or message as described in or related to any of examples 1-68, or portions or parts thereof, or otherwise described in the present disclosure.

Example 72 may include an electromagnetic signal carrying computer-readable instructions, wherein execution of the computer-readable instructions by one or more processors is to cause the one or more processors to perform the method, techniques, or process as described in or related to any of examples 1-68, or portions thereof.

Example 73 may include a computer program comprising instructions, wherein execution of the program by a processing element is to cause the processing element to carry out the method, techniques, or process as described in or related to any of examples 1-68, or portions thereof.

Example 74 may include a signal in a wireless network as shown and described herein.

Example 75 may include a method of communicating in a wireless network as shown and described herein.

Example 76 may include a system for providing wireless communication as shown and described herein.

Example 77 may include a device for providing wireless communication as shown and described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. In an example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "computing device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

What is claimed is:

1. A method performed for side-link (SL) positioning, the method comprising:
    sending, to a transmitting UE (Tx UE) and a receiving UE (Rx UE), a request for sidelink (SL) positioning reference signal (PRS) capabilities data;
    receiving, from each of the Tx UE and the Rx UE, respective SL PRS capabilities data;
    configuring a SL positioning reference signal (PRS) that is based on the SL PRS capabilities data for each of the Tx UE and the Rx UE;
    sending data specifying a selected SL PRS configuration to the Tx UE;
    receiving an acknowledgement signal from the Tx UE indicating a Tx UE SL PRS configuration that is based on the selected SL PRS configuration; and
    providing, to the Rx UE, the Tx UE SL PRS configuration.

2. The method of claim 1, further comprising:
    receiving, from the Rx UE, a positioning measurement based on the Tx UE SL PRS configuration.

3. The method of claim 1, further comprising configuring the SL PRS by a location management function (LMF).

4. The method of claim 1, further comprising configuring the SL PRS by gNB.

5. The method of claim 1, further comprising configuring the SL PRS by a gNB and a LMF, wherein the LMF generates the SL PRS configuration, and wherein the gNB updates at least a portion of the SL PRS configuration.

6. The method of claim 1, wherein a gNB sends the request for the SL PRS capabilities data using radio resource control (RRC) signaling, and wherein the gNB sends the capabilities data to a LMF using a new radio positioning protocol A (NRPPa) message.

7. The method of claim 1, wherein a LMF sends the request for the SL PRS capabilities data using an LTE positioning protocol (LPP) message.

8. The method of claim 7, wherein the LMF provides the SL PRS configuration as part of an LPP provide assistance data message being sent to the Tx UE and/or the Rx UE.

9. The method of claim 1, further comprising:
    sending an LPP message including a SL PRS activation/deactivation request to Tx UE through gNB relay to activate SL PRS transmission; and
    causing the UE to initiate SL PRS transmission based on the SL PRS activation/deactivation request.

10. The method of claim 1, further comprising:
    sending a NRPPa message including a SL PRS activation/deactivation request to cause activation or deactivation of SL PRS transmission at UE; and
    causing, by a medium access control (MAC) control element (CE) of a gNB, the UE to initiate SL PRS transmission based on the SL PRS activation/deactivation request.

11. The method of claim 1, wherein the SL PRS capabilities data comprises an SL-PRS-ID.

12. The method of claim 1, wherein the SL PRS capabilities data comprises an absolute radio-frequency channel number (ARFCN).

13. The method of claim 1, wherein the SL PRS capabilities data comprises one or more of a starting offset of a resource or a resource set, a resource repetition pattern, an expected SL-PRS measurement value, or a measurement error value.

14. The method of claim 1, wherein configuring the SL PRS comprises configuring hybrid positioning, a UE-initiated on-demand SL-PRS request, a multi-path in SL-PRS measurements, RSRP measurement reporting, periodic reporting, a maximum SL PRS bandwidth in MHz, a duration of SL PRS symbols a number of in units of milliseconds a UE can process every given number of milliseconds, or a number of SL PRS resources that the Tx UE or Rx UE processes in a slot.

15. One or more processors configured to perform side-link (SL) positioning by performing operations comprising:
    sending, to a transmitting UE (Tx UE) and a receiving UE (Rx UE), a request for sidelink (SL) positioning reference signal (PRS) capabilities data;

receiving, from each of the Tx UE and the Rx UE, respective SL PRS capabilities data;

configuring a SL positioning reference signal (PRS) that is based on the SL PRS capabilities data for each of the Tx UE and the Rx UE;

sending data specifying a selected SL PRS configuration to the Tx UE;

receiving an acknowledgement signal from the Tx UE indicating a Tx UE SL PRS configuration that is based on the selected SL PRS configuration;

sending, to the Rx UE, the Tx UE SL PRS configuration; and receiving, from the Rx UE, a positioning measurement based on the Tx UE SL PRS configuration.

16. The one or more processors of claim 15, the operations further comprising configuring the SL PRS by a location management function (LMF).

17. The one or more processors of claim 15, the operations further comprising configuring the SL PRS by a gNB and a LMF, wherein the LMF generates the SL PRS configuration, and wherein the gNB updates at least a portion of the SL PRS configuration.

18. The one or more processors of claim 15, wherein a gNB sends the request for the SL PRS capabilities data using radio resource control (RRC) signaling, and wherein the gNB sends the capabilities data to a LMF using a new radio positioning protocol A (NRPPa) message.

19. The one or more processors of claim 15, the operations further comprising:

sending an LPP message including a SL PRS activation/deactivation request to Tx UE through gNB relay to activate SL PRS transmission; and causing the UE to initiate SL PRS transmission based on the SL PRS activation/deactivation request.

20. The one or more processors of claim 15, the operations further comprising:

sending a NRPPa message including a SL PRS activation/deactivation request to cause activation or deactivation of SL PRS transmission at UE; and causing, by a medium access control (MAC) control element (CE) of a gNB, the UE to initiate SL PRS transmission based on the SL PRS activation/deactivation request.

\* \* \* \* \*